United States Patent

Bontempi et al.

[15] 3,656,603
[45] Apr. 18, 1972

[54] ALIMENTARY PASTE PRODUCT HANDLING MACHINE

[72] Inventors: Ignatius Bontempi, Douglaston; Joseph De Francisci, Jr., Rockville Centre, both of N.Y.

[73] Assignee: De Francisci Machine Corporation, Brooklyn, N.Y.

[22] Filed: Sept. 23, 1970

[21] Appl. No.: 74,585

[52] U.S. Cl..................................198/20, 198/102, 198/85, 107/27 R, 107/45
[51] Int. Cl.......................................................B65g 47/00
[58] Field of Search.................198/179.21, 85, 102, 180, 20; 271/79; 226/103; 34/148, 18, 236, 162, 163; 15/167, 168, 206; 107/27 R, 45

[56] References Cited

UNITED STATES PATENTS 1,685,799  10/1928  Baker.........................................271/61

*Primary Examiner*—Richard E. Aegerter
*Attorney*—Darby & Darby

[57] ABSTRACT

A long alimentary paste product handling machine for stripping dried strands of the paste product from drying sticks and for conveying the stripped strands to a cutting station is described. A clamping device grasps the heads (the U-shaped portions) of the paste product strands as a hook on a continuous conveyor engages the supporting end of a drying stick and removes it from between the legs of the clamped strands. A pair of spaced tables which support the stripped strands transfer the strands to conveyors which are positioned between and beneath the tables and which transport the strands to the cutting station by pivoting downwardly to below the level of the conveyors. The tables pivot in the same direction of travel and at the same rate of travel as the conveyors in order to minimize transfer forces and thereby reduce breakage.

12 Claims, 9 Drawing Figures

ALIMENTARY PASTE PRODUCT HANDLING MACHINE

This invention generally relates to a machine for handling long alimentary paste products such as spaghetti, macaroni, and, particularly, lasagna.

In the final stages of producing long alimentary paste products, it is conventional to drape strands of the product over long sticks or racks which are supported at their ends. The product strands are then conveyed on the sticks through a drying operation during which the strands become stiff and somewhat brittle thereby forming relatively rigid inverted U-shaped members.

After the drying operation is completed the inverted U-shaped strands are removed from the sticks and conveyed to a final processing operation where they are cut into predetermined lengths and packaged for market. Because of the brittleness of the dried U-shaped product strands, it was at one time thought best to remove the sticks from the product strands manually so as to reduce breakage. However, this proved unsatisfactory because of the difficulty in maintaining high sanitary standards and because of the expense involved in the continuous manual handling of the products. Thereafter, stripping machines were developed to automatically remove the sticks from the U-shaped strands and convey the strands to the cutting operation. A major problem with these machines was that a high degree of breakage of the brittle U-shaped strands occurred as a result of the frictional forces produced during the stripping operation. To reduce the frictional effect, it was necessary to operate the machines at a relatively low rate of speed thereby severely cutting the operating efficiency of the machines.

In one such prior art machine, the U-shaped product strand was brought to a substantially horizontal position with the stick being initially nested in the U-shaped portion of the strand. A supporting wall or block was then brought into engagement with the free ends of the product strands as the stick was engaged by a hook which caused the stick to exit from between the product strands. Since the free ends of the strands were butted up against a supporting wall, the frictional force exerted by the stick on the longitudinal sides or legs of the strand as the stick was removed caused those portions of the strands between the stick and the supporting wall to be under a varying compressive force. The compressive force on the sides of the produce strands was responsible for the high degree of breakage when this prior art machine was employed. Furthermore, this machine was especially unacceptable for stripping U-shaped strands of lasagna with its rippled surfaces from a drying stick. During the stripping operation, the prior art machine would directly engage (rather than frictionally engage as with non-rippled surface products) a ripple on the surface of a lasagna strand and exert a direct compressive force on those portions of the lasagna strand between the stick and the supporting wall thereby causing a greater degree of failure than with non-rippled alimentary paste product strands.

It is accordingly an object of this invention to provide a machine for automatically stripping dried strands of long alimentary paste products such as macaroni, spaghetti, and, particularly, lasagna from a drying stick.

It is a further object of this invention to provide a machine for automatically transferring stripped strands of alimentary paste products to a cutting station.

It is a further object of this invention to strip long strands of alimentary paste products from a stick and transfer the strands for cutting with a minimum of breakage and at a relatively fast rate.

Briefly, the machine of this invention accomplishes the above objects by conveying the supporting ends of the sticks on which the dried, vertically depending product strands are draped, through a closed track which, in combination with a table positioned beneath the track, causes the product strands to assume a substantially horizontal position. The closed track can be diagramatically viewed as being the shape of a right triangle with the long leg of the triangle being horizontally disposed and the short leg of the triangle being vertically disposed. As the stick is conveyed down the hypotenuse of the triangle, the depending product strands are engaging an upwardly inclined surface so that when the stick has reached the bottom tip of the hypotenuse the free ends of the product strand are supported on a horizontal gathering table which is positioned beneath the level of the track.

At this point, a pair of C-shaped clamps within which sponge rubber members are mounted are actuated to securely grasp the heads or U-shaped portions of the product strands in a fashion similar to the action of closing jaws. Although the force applied by the clamps on the heads or U-shaped portions of the product strands is not sufficient to break or crack the heads, the force is sufficient to securely hold the product strands as the stick continues progressing around the track and out from between the legs of the product strands. Diagramatically, the stick progresses along the horizontally disposed leg of the above-referred to right triangle in a direction opposite to the direction of the stick's travel down the hypotenuse of the triangle. The heads of the product strands are clamped at the junction of the hypotenuse and the horizontally disposed leg of the hypotenuse.

By clamping the head portion of the product strands, as opposed to butting the free ends of the strand against a wall as in the prior art, the frictional force of the withdrawing stick imparts a tensional force to those portions of the product strands between the clamps and the stick. The likelihood of breakage is greatly lessened by providing a tensional force rather than a compressional force on the product strands. Furthermore, the sponge rubber members which grasp the heads of the product strands are flexible to permit easier egress of the rod from between the product strands when the stick encounters interference on the surfaces of the strands.

The machine of this invention is particularly adapted for use with strands of lasagna. As previously mentioned, lasagna strands are formed with ruffles or ripples on their surfaces which make rod egress particularly difficult. However, the flexibility of the sponge rubber clamps permits the stiffened lasagna strands to elevate or descend in response to the engagement of the rod with a ruffle or ripple on the surfaces of the lasagna strands.

As the rod continues egressing from between the legs of the product strands, the clamps on the heads of the strands act as a pivot and the strands gradually assume a substantially horizontal position. When the rod has completed its egress from between the product strands, the clamps disengage and the strands drop a short distance onto two gathering tables positioned beneath the closed track. The stationary gathering tables are normally located above and between continuously moving conveyor belts which carry the product strands to a cutting station. Heretofore, there has been a high degree of breakage in transferring the product strands to the conveyors because the strands were often dropped onto moving conveyors. A feature of the machine of this invention is that the gathering tables upon which the stripped product strands are disposed are pivoted downwardly to below the level of the conveyors so that the strands are placed on the conveyors with a minimum transfer force.

This is accomplished by pivoting the gathering tables downwardly in the same direction of travel as the conveyor belts and at the same rate of speed as the conveyors. By assuring a minimum degree of force is applied to the stripped product strands during this transfer operation, the breakage rate of the stripped product strand is greatly reduced.

These and other objects and features of this invention will be more readily understood and appreciated by reference to the following descriptions and drawings of which:

Figure 1:
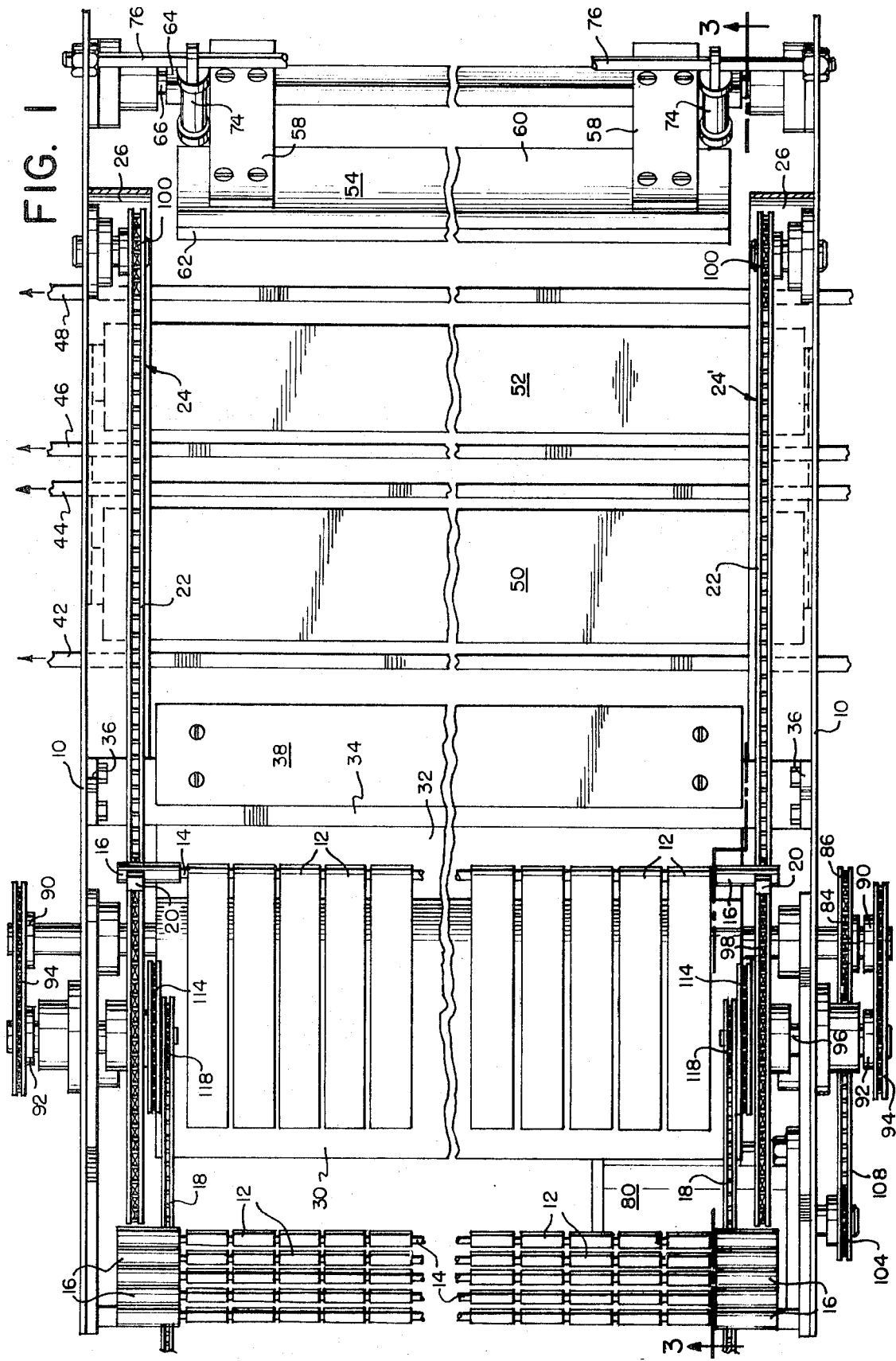
FIG. 1 is a plan view of the machine of this invention.

FIGS. 5, 6, 7, 8, and 9 are side-elevational views partially cut away of the machine illustrated in FIG. 1 showing the progressive egression of a stick from between a product strand during the stripping operation and the transfer of the stripped strands to a cutting station.

Figure 3:
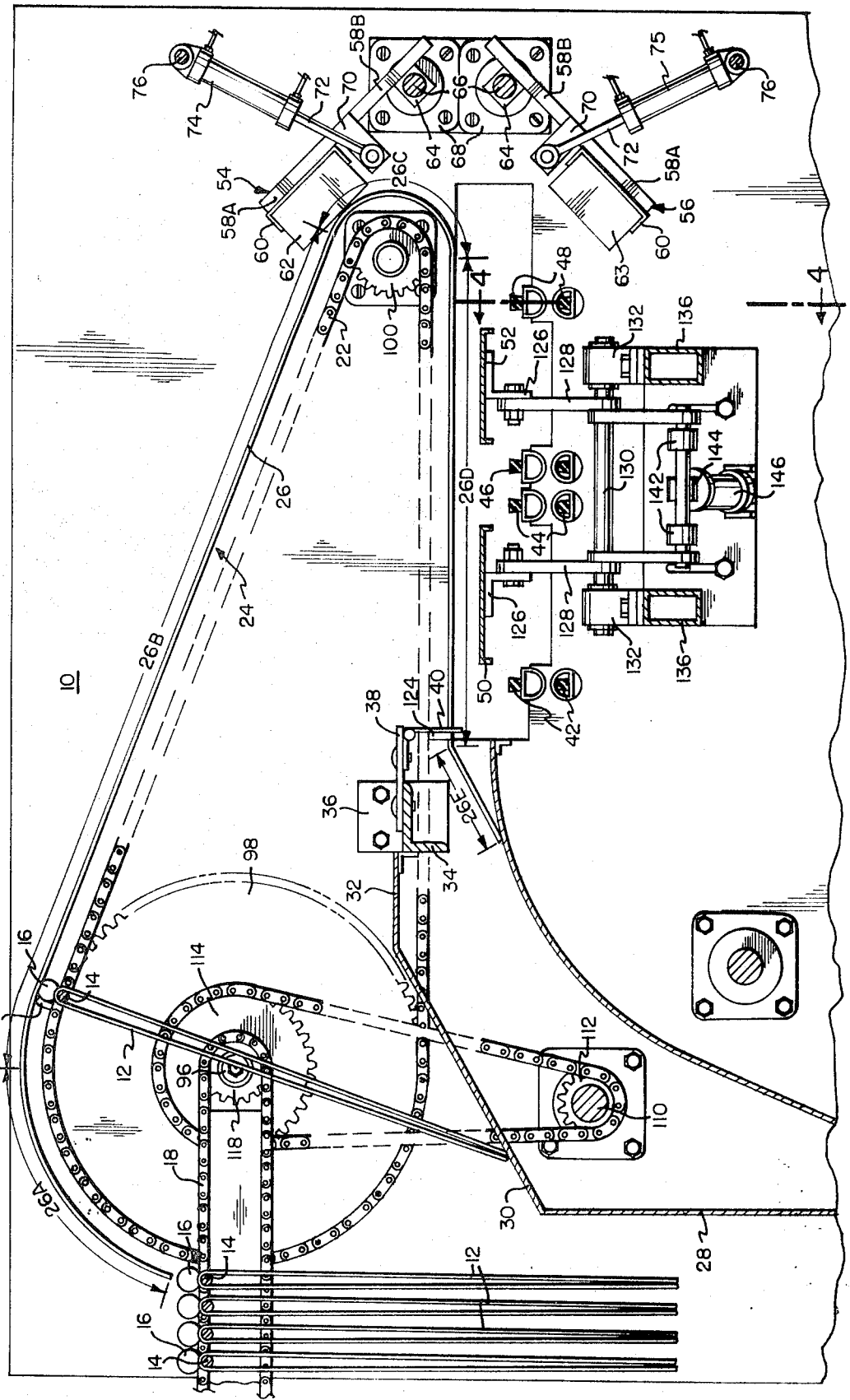
FIG. 3 is a cross-sectional view of the machine illustrated in FIG. 1 taken along the line 3—3.

Referring now to FIGS. 1 and 3, the stripping machine of this invention is illustrated. As is evident from FIG. 1, the mechanisms on each side of the machine are substantially the same. Accordingly, for purposes of this description, only the mechanisms of one side of the machine will be described with it being understood that the corresponding mechanisms on the other side of the machine perform the same functions in the same manner as the described mechanisms. In some instances, corresponding members are illustrated with primed numerals.

The machine is bounded on each of its lateral sides by a supporting wall 10 onto which many of the mechanisms of the machine are attached.

The long alimentary paste product strands 12 (hereinafter referred to as strands or product strands) are shown draped over a number of longitudinally extending sticks 14 which are supported at their ends by cylindrical members 16 which are molded or attached in some other appropriate fashion to the sticks 14. The strands are draped over the sticks so as to form linear rows. It is noted that the cylindrical members 16 are of a wider diameter than the sticks 14. In this way the cylindrical members 16 may be spaced closely together while still maintaining a spacing between the product strands on adjacent sticks. The legs of the strands initially descend downwardly from the stick as it is conveyed toward the stripping operation. At this stage the product strands have been dried and are stiff to the point of being somewhat brittle. The sticks 14 are transported to the stripping operation by a conveyor 18 having hooks (not shown) which engage the cylindrical member 16.

As the sticks 14 and the product strands 12 progress forwardly toward the stripping operation on conveyor 18 in the direction of the arrow illustrated in FIGS. 1 and 3, the cylindrical members 16 come into engagement with hooks 20 which are attached to conveyor 22 in closed track 24. Closed track 24 is formed by the conveyor 22 and a rail 26 which is spaced from the conveyor. For purposes of illustration, the rail 26 can be divided into a number of portions or sections which correspond to a particular function of the stripping machine. Portion 26A of the rail is in the shape of a circular quadrant and corresponds to the upper portion of vertically extending short leg of the right triangle referred to above; portion 26B is a downwardly sloping inclined surface which corresponds to the right triangle hypotenuse; portion 26C is semi-circular in shape and corresponds to the intersection of the hypotenuse and horizontally extending long leg of the right triangle; portion 26D is horizontal and corresponds to the long leg of the right triangle and portion 26E is an inclined surface which is sloped downwardly and leads to a stick return mechanism.

As the cylindrical member 16 is engaged by the hook 20 at the beginning of the closed track and carried upwardly to the position illustrated in FIG. 3, the downwardly depending strand legs are prevented from progressing forwardly by a vertical supporting member 28 which is disposed in the path of the progressing strands. As the cylindrical member 16 progresses forwardly in the closed track 24, the strands engage an upwardly inclined member 30 which is disposed above the vertical member 28. In this way, as the cylindrical member 16 progresses downwardly along rail portion 26B, the downwardly depending strand legs gradually are inclined to a position which forms a slight angle with the horizontal (see the position of the strands 12 in FIG. 5).

The inclined surface member 30 leads into a horizontal member 32 over which the strands are passed as the cylindrical member 16 progresses forwardly along the closed track 24. An angle iron 34 which extends traversely across the machine is attached to each of the supporting wall members 10 of the machine by a bracket 36. A plate 38 which extends traversely between the closed tracks 24 on each side of the machine, as illustrated in FIG. 1, is attached to the horizontal portion of angle iron 34 in cantilever fashion.

Figure 8:
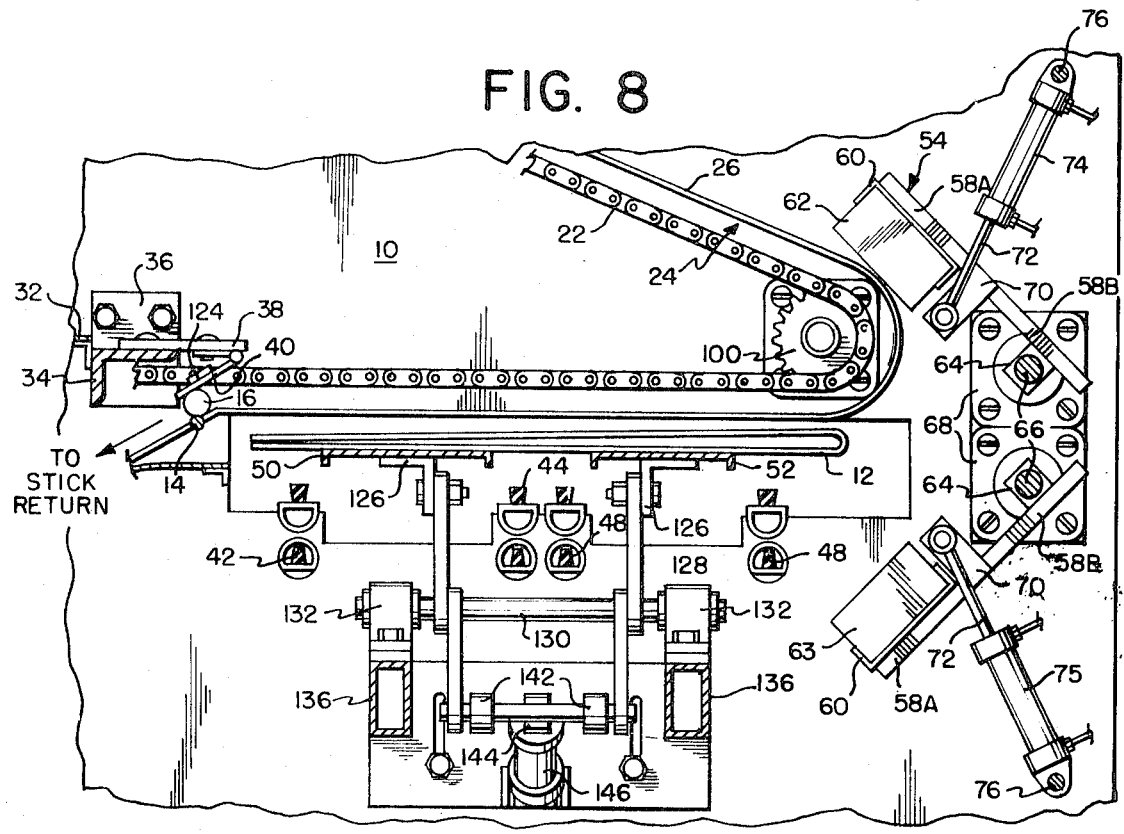

A vertically depending gate 40 is pivotally mounted on the underside of the plate 38. The gate 40 pivots upwardly as the stick 14 is conveyed down the rail inclined portion 26E as illustrated in FIG. 8, to the stick return mechanism.

Conveyors 42 and 44, 46 and 48 are positioned traversely of the machine and below the closed track member 24. These conveyors are for transferring the stripped product strands to the cutting operation. The conveyors are positioned beneath the gathering tables 50 and 52 which extend traversely of the machine on which the strands are disposed after the stripping operation is completed.

A pair of clamping members 54 and 56 are positioned at the stripping end of the machine opposite the stick input end and between the rail portions 26 on each side of the machine. One of the clamping members 54 is normally positioned above the level of the rail portion 26C and the other clamping member 56 normally positioned below it. Since the upper and lower clamping members are the same and perform the same function in the same manner, only the upper clamping member 54 is described in detail. Upper clamping member 54 consists of a plate 58 having a forward portion 58A and a rearward portion 58B. A C-shaped clamp 60 is attached to the underside of the plate forward portion 58A. A flexible member 62 such as sponge rubber or any other suitable material is disposed within the C-shaped clamp 60. The plate rearward portion 58B is attached to a freely rotatable collar 64 which is generally square in cross-section and which is supported by a cylindrical shaft 66 which extends through a central cavity in collar 64. The cylindrical shaft 66 which is stationary is journaled into a collar 68 which is attached to the supporting wall 10 of the machine. Midway between the forward and rearward portions the plate 58 is a lever 70 which extends perpendicularly downwardly from the underside of the plate.

Figure 6:
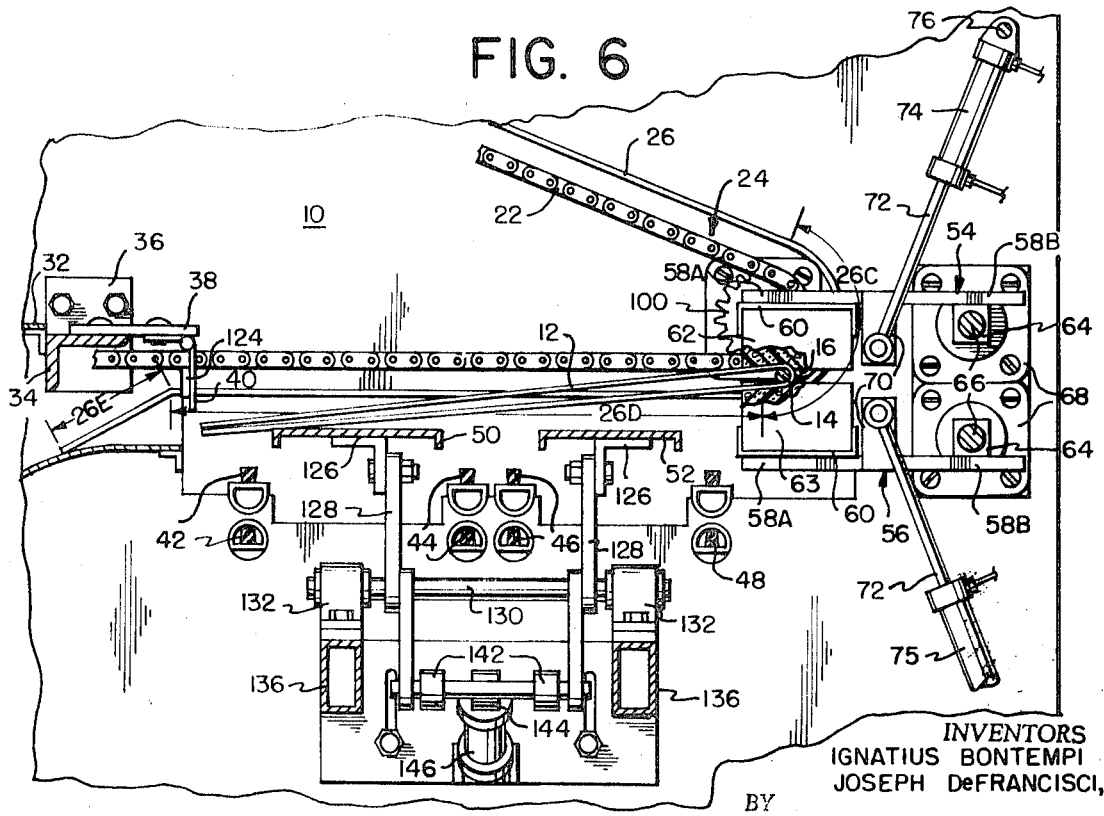
Figure 7:
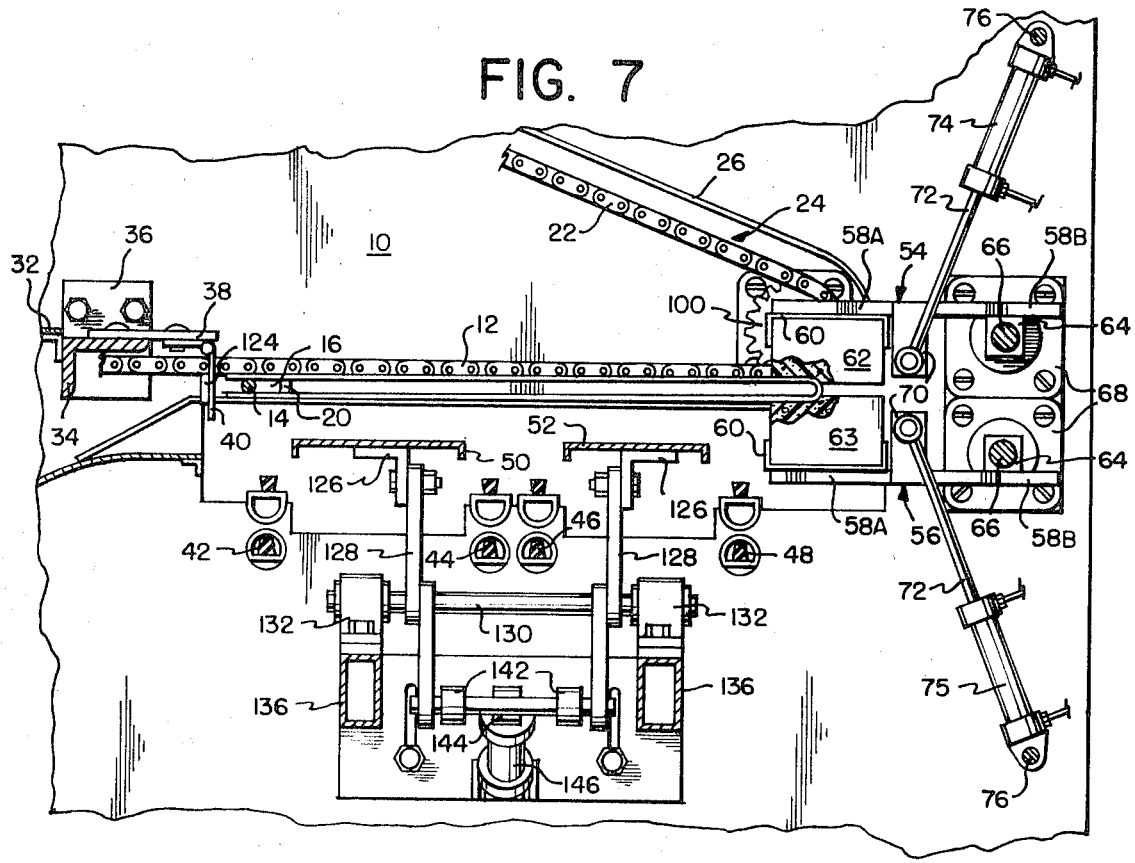

The lever 70 is pivotally attached to the piston 72 of an air cylinder 74 which is supported on a shaft 76 which extends traversely of the machine and is attached to the supporting wall 10 of the machine. When the air cylinder 74 is actuated, the piston extends outwardly forcing the clamping mechanism 54 downwardly into engagement with the heads of the product strands as illustrated in FIGS. 6 and 7.

Figure 2:
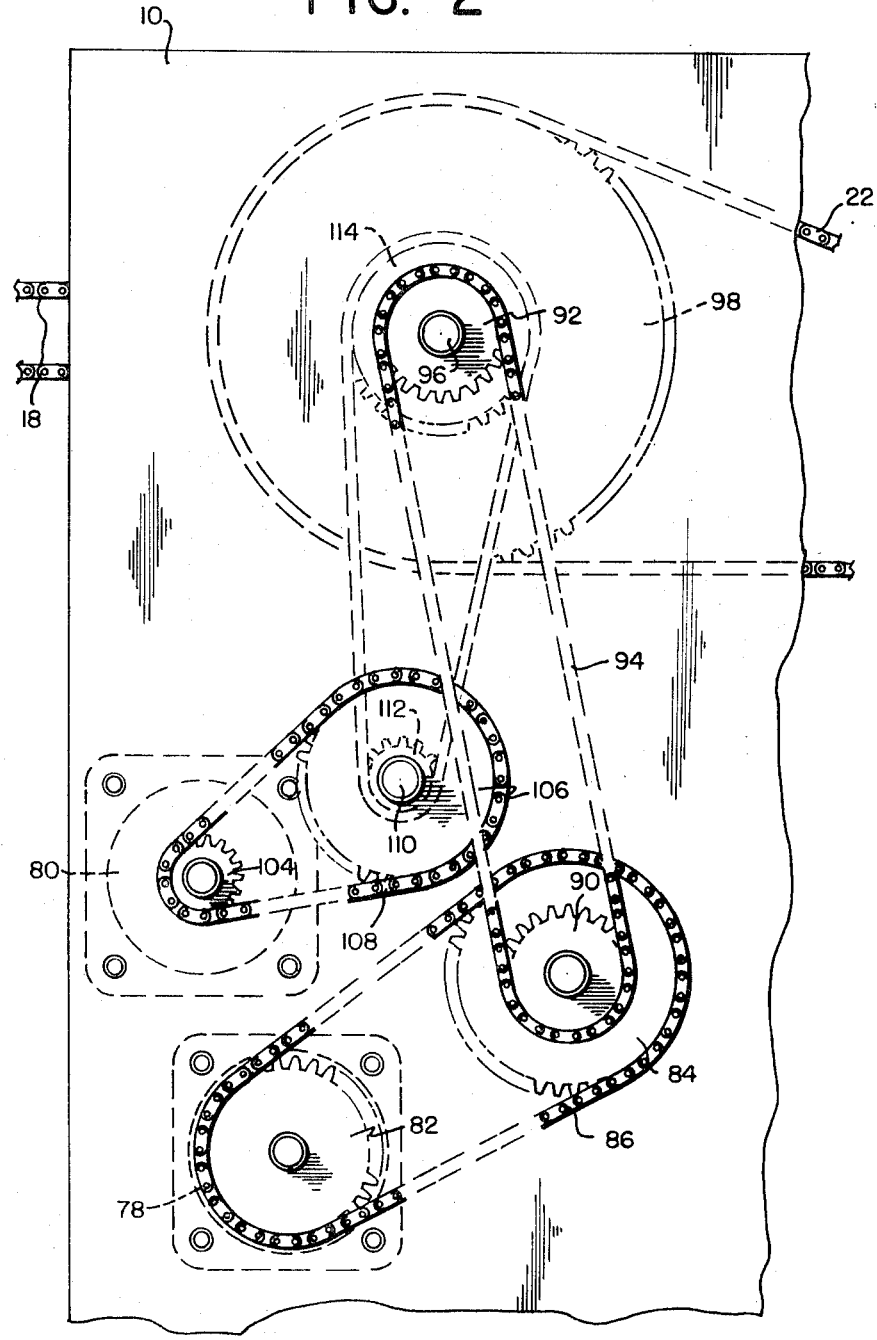
FIG. 2 is a side elevational view, partially cut away, of the drive mechanisms for the machine illustrated in FIG. 1.

Referring now to FIGS. 1 and 2, the drive mechanisms of the machine of this invention are described. This machine is driven by two independent motors 78 and 80 which are each mounted on the supporting wall 10 of the machine.

Motor 78 causes the cylindrical members 16 attached to the ends of the sticks 14 to be conveyed through the closed track 24 so that the sticks are removed from between the legs of the product strands. Initially motor 78 imparts rotary motion to driving gear 82 which is attached to the motor. Gear 82 imparts its rotary movement to driver gear 84 by way of connecting belt 86. Since driver gear 84 is journaled onto a shaft 88 onto which gear 90 is also journaled, the rotary movement of gear 84 is thereby transmitted to gear 90. The rotary movement of gear 90 is imparted to gear 92 through drive chain 94. Since gear 92 is journaled onto shaft 96 as is gear 98, the rotary movement of gear 90 is transmitted to gear 98. Gear 98 which is of relatively large diameter and gear 100 (Illustrated in FIG. 3) which is of relatively small diameter together with drive belt 102 which connects the two gears form the conveyor which transports the cylindrical members 16 through the closed track 24.

Motor 80 causes the cylindrical members 16 and therefor the sticks 14 with the draped product strands 12 to be conveyed from the drying operation to the closed track 24 for the stripping operation. Gear 104 which is attached to motor 80 imparts the rotary movement produced in the motor to gear 106 by way of a drive belt 108. Since gear 106 is journaled onto shaft 110 as is gear 112, the rotary movement produced by motor 80 is thereby transferred to gear 112. Gear 112 imparts its rotary movement to gear 114 which is rotatably supported on shaft 116. Gear 118 imparts its rotary movement to conveyor 61 which transports the paste products strands toward the stripping operation by transporting the cylindrical members 16 to the closed track 24.

The steps in the stripping operation are progressively illustrated in FIG. 3 and FIGS. 5–9. Referring first to FIG. 3, the cylindrical member 16 to which stick 14 is attached is initially picked up from the feed-in conveyor 18 by hooks 20 and introduced into closed track 24. The cylindrical member 16 is transported through the circular quadrant defined by rail portion 26A as the depending paste product strands first engage vertical member 28 and subsequently, an upwardly inclined member 30. As the cylindrical member progresses forwardly in the closed track through the downwardly inclined section defined by rail portion 26B, the depending product strand legs progressively form smaller angles with the horizontal until the point where the angle of the product strand legs is equivalent to the angle of the upwardly inclined member 30. Further progression of the cylindrical members 16 along rail 26B after this point has been reached causes the product strand legs to be pulled onto a horizontal member 32.

Figure 5:
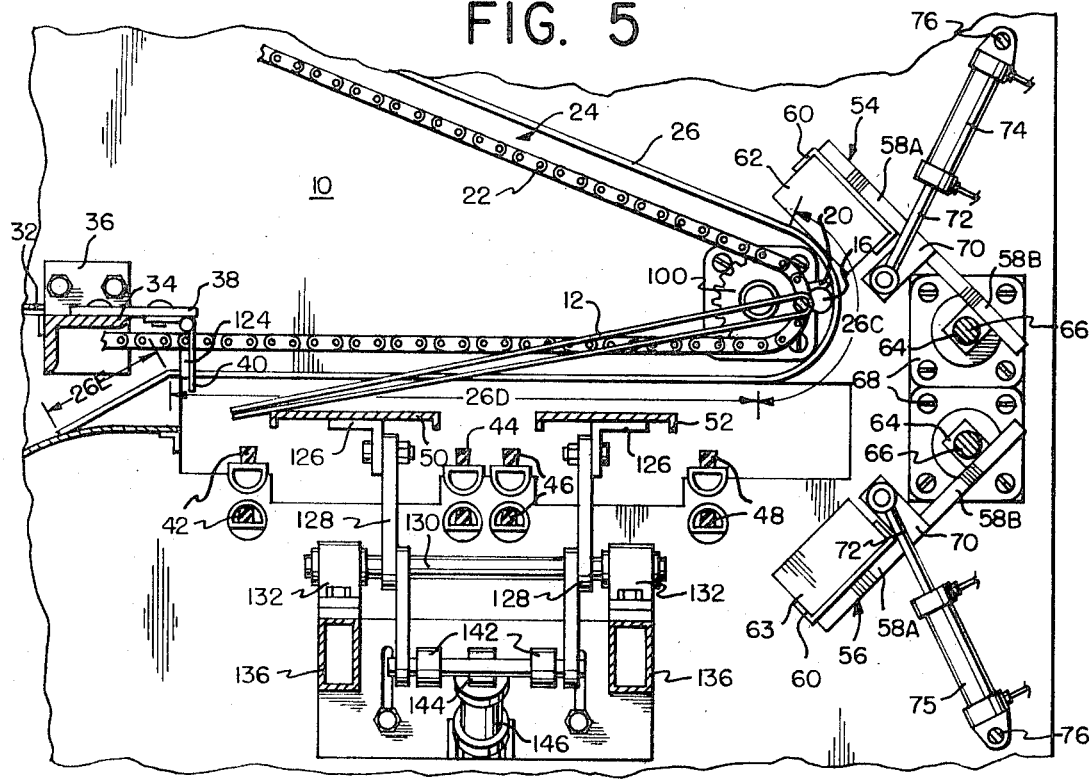

Referring now to FIG. 5, further progression of the cylindrical member 16 in the closed track 24 to the portion defined by rail portion 24C results in the product strand legs being pulled across the horizontal member 32, the plate 38 and onto the edge of a gathering table 50. As the cylindrical member 16 progresses through the semi-circular portion of the closed track 24 defined by rail portion 26C, the cylindrical member reaches the extremity of its forward travel in the closed track which is illustrated in FIG. 5. As the cylindrical member moves along the lower portion of rail portion 26C, the member is traveling toward the stick input mechanism and the free ends of the paste product strand move rearwardly across the gathering table 50.

Referring now to FIG. 6, when the circular member 16 has progressed through the section of the closed track 24 defined by rail portion 26C, the clamping mechanisms 54 and 56 are actuated by their respective air cylinders and the heads of the product strands are firmly engaged by the flexible members 62 and 63. It should be noted that the cylindrical members 16 which progress through the closed track 24 are never engaged by the clamping mechanisms 54 and 56 since the clamping mechanisms are positioned between the closed tracks 24 and 24' on each side of the machine. Once the clamping mechanisms 54 and 56 have engaged the heads of product strands, the stripping of the stick, from between the depending legs of the strands begins. As the hook members 20 on the conveyor 22 transport the rollers 16 along the horizontal portion of the closed track 24 defined by rail portion 26D, the sides of the stick 14 frictionally engage the inwardly facing surfaces of the product strands. This causes the product strand legs to rise from the angular position illustrated in FIG. 6 to an angular position which approaches the horizontal as the cylindrical roller progresses further along the horizontal portion of the closed track 24.

Referring now to FIG. 7, it is seen that the product strand assumes a substantially horizontal position when the cylindrical member 16 has been transported through the portion of the closed track 24 defined by rail portion 26D. At this point, the stick has nearly completed its exit from between the legs of the product strand and the stripping operation is almost completed. The entire time the stick is exiting from between the legs of the product strands, the heads of the product strand are securely grasped by the clamping mechanisms 54 and 56.

Referring now to FIG. 8, when the stripping operation is completed, the clamping mechanisms automatically release the heads of the product strands and the strands drop a short distance onto the gathering tables 50 and 52. The release of the clamping mechanisms is actuated by microswitch 124 positioned on the rear surface of pivotable gate 40. After the cylindrical member 16 has been transported past the portion of the closed track defined by rail portion 26D, it is conveyed to the downwardly inclined portion of the closed track defined by said portion 26E. Pivotally mounted gate 40 blocks the entrance to rail portion 26E so that it is necessary for the cylindrical member to pivot the gate in order for it to proceed further. Since the stripping operation is completed when the cylindrical member reaches this point there is no longer any necessity to grasp the paste product heads and they are released as the cylindrical member pivots the gate. The gate 40 leads to a stick return mechanism which returns the sticks to another station where wet product strands are draped over the sticks prior to the drying and the stick feed-in operations which begin the stripping cycle anew.

Figure 4:
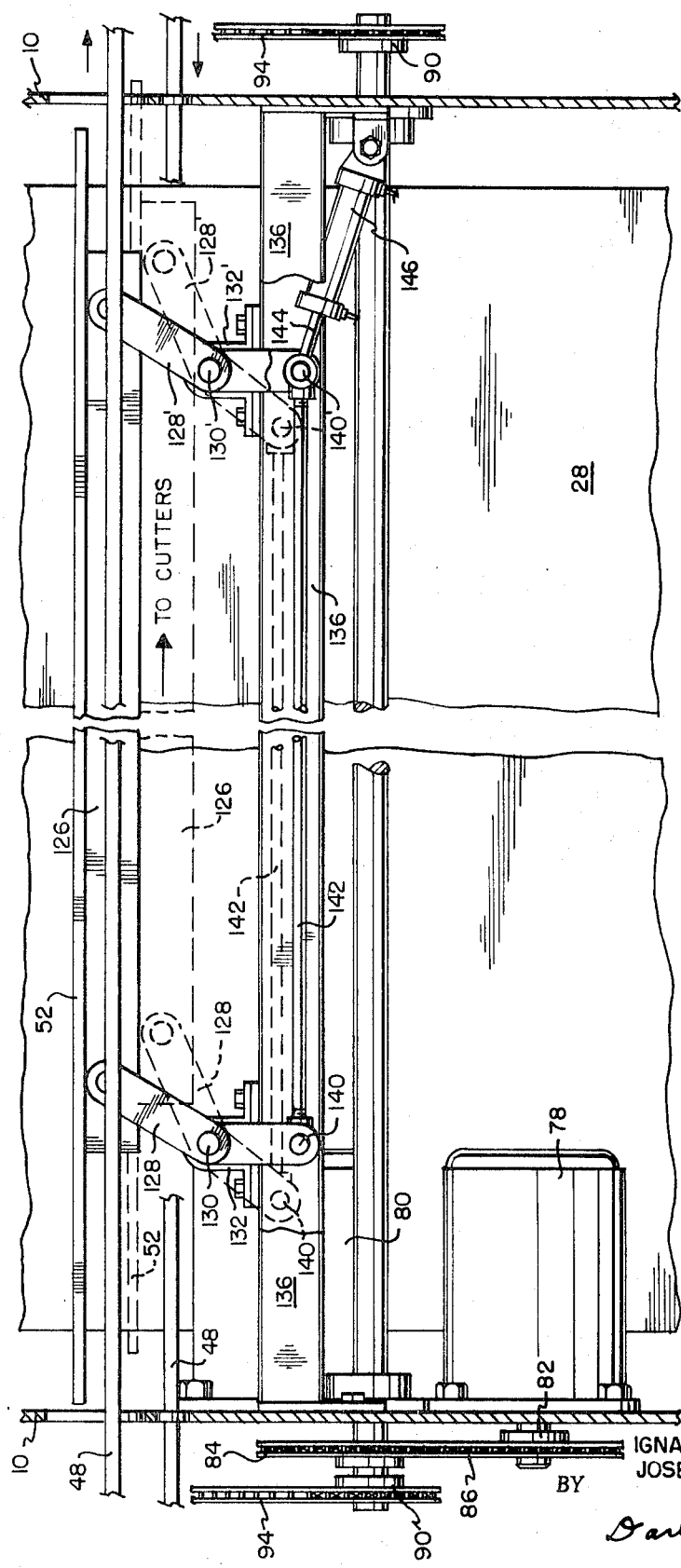
FIG. 4 is a cross-sectional view of the machine illustrated in FIG. 3 taken along the lines 4—4.
Figure 9:
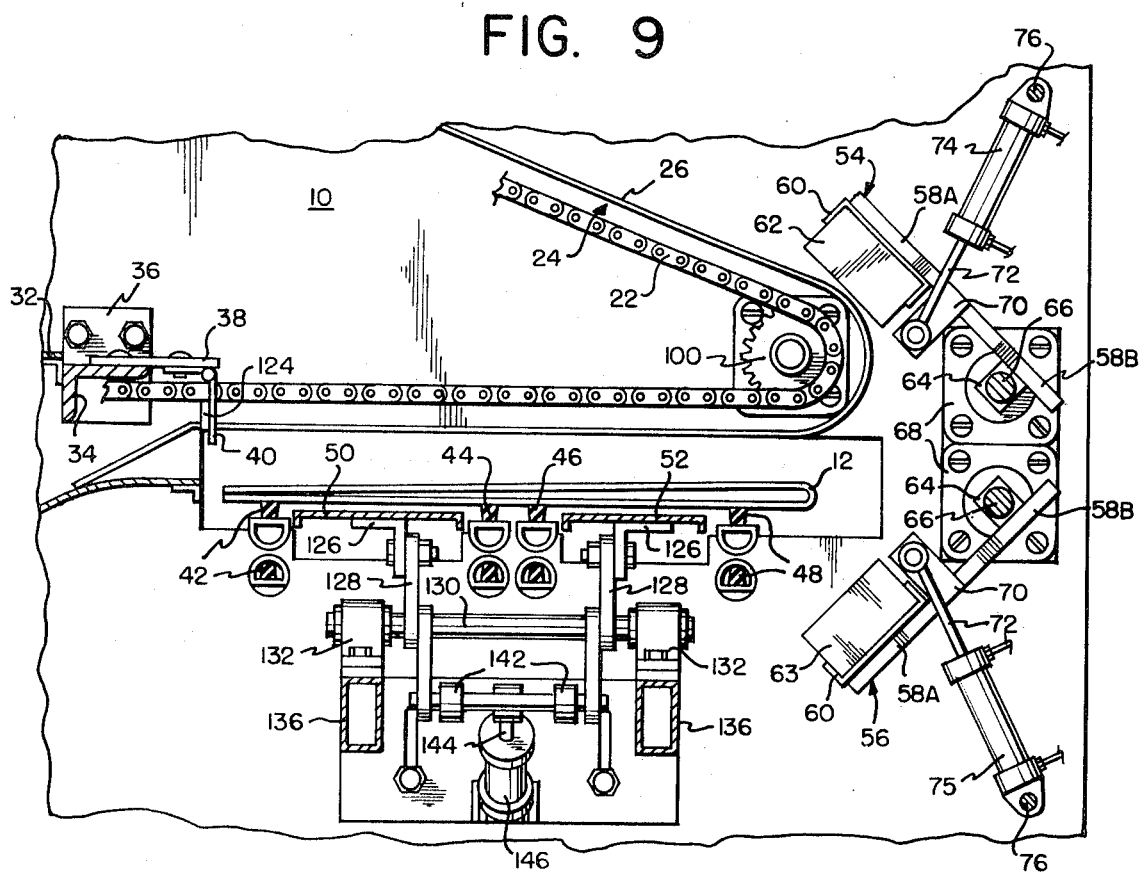

Referring now to FIGS. 1 and 3 and particularly to FIGS. 4 and 9, the operation by which the product strands on gathering tables 50 and 52 are transferred to conveyors 42, 44, 46, and 48, which transport the strands to the cutting operation, is illustrated.

Gathering tables 50 and 52 onto which the product strands are transferred subsequent to the stripping operation are positioned between and below the level of the closed tracks 24 on each side of the machine. Conveyor 42 is between end plate 122 and gathering table 50; conveyors 44 and 46 are positioned between gathering tables 50 and 52 and conveyor 48 is positioned between gathering table 52 and the clamping mechanisms 54 and 56. The gathering tables 50 and 52 are normally positioned above the level of the conveyors which transport the product strands to the cutting operation. Accordingly, after the stripping operation is completed and the paste product strands are dropped onto the gathering tables, the tables are lowered to below the level of the conveyors so that the strands are brought into engagement with the conveyors and transferred to the cutting operation. In operation, the gathering tables pivot downwardly in the direction of travel as the conveyors and at the same rate of travel as the conveyors. In this way, minimum force is exerted on the product strands during the transfer operation thereby reducing the probability of incurring breakage.

The mechanisms which cause the gathering tables to pivot downwardly to below the level of the conveyors are illustrated in FIGS. 3 and 4. Since the same pivoting mechanisms operation on table 50 and 52 in the same manner, the mechanisms are only described with relation to table 50. Table 50 is supported by a longitudinally extending angle iron 126. Levers 128 and 128' are attached to the vertical portion of the angle iron at each end of the angle iron. The levers 128 and 128' are journaled onto shafts 130 and 130' respectively which are rotatably mounted in brackets 132 and 132' respectively. Brackets 132 and 132' are each supported by a beam 136 which extends traversely the width of the machine and which is attached to each of the supporting walls 10 of the machine. One end of each of the levers 138 and 138' is journaled onto shafts 130 and 130' respectively and the other end, of each of the levers is journaled onto shafts 140 and 140' respectively. A rod 142 extends transversely between shafts 140 and 140' and is rotatably mounted on each of these shafts. The piston 144 of an air cylinder 146 is operably connected to shaft 140' so that as the piston pushes outwardly, shaft 140, levers 128 and 138 and levers 128' and 138' are pivoted about shafts 130 and 130' respectively thereby causing the gathering table 50 to pivot downwardly to a position below the level of the conveyors. As illustrated in FIG. 4, as the piston 144 pushes outwardly, a force is directly exerted on shaft 130 and indirectly exerted on shaft 130' by rod 142 to pivot the levers and the table from the positions indicated in solid lines to the position indicated in dotted lines. As previously mentioned, the rate of movement of the table 50 and the conveyors is the same. This is accomplished by synchronizing the rate of travel of the piston 144 with the rate of travel of the conveyors. The microswitch 124 which is mounted on the rear surface of the gate 40 which is actuated when the cylindrical member 16 pivots the gate upwardly and which controls the actuation of the air cylinders 74 and 75 which causes the clamping mechanism 54 and 56 to release the product strand heads, also actuates the air cylinder 146 which causes the tables 50 and 52 to begin pivoting downwardly.

While a single embodiment of various aspects of the invention has been shown in the drawings, it is to be understood that this disclosure is for the purpose of illustration only and that various changes in shape, proportion, and arrangement of parts, as well as the substitution of equivalent elements for those herein shown and described, may be made without departing from the spirit and scope of the invention as set forth in the appended claims.

What is claimed is:

1. An alimentary paste product handling machine for stripping long product strands from a stick over which the strands are draped, each of the strands having a head or U-shaped portion with depending legs, comprising
   a conveyor for transporting the stick over which the product strands are initially draped in a first direction, from a first point on said conveyor to a second point on said conveyor; and
   means located at said conveyor second point for grasping the U-shaped portions of the strands on the stick while said conveyor transports the stick in a second direction away from said conveyor second point to a third point on said conveyor; said conveyor third point being located a distance greater than the length of the product strands away from said conveyor second point.

2. The handling machine recited in claim 1 wherein said grasping means include a pair of pivotally mounted clamps, a flexible member mounted within each of said clamps for directly engaging product strand U-shaped portions and
   means connected to each of said clamps for actuating said clamps into engagement with the product strand U-shaped portions when the stick is conveyed to said conveyor second position.

3. The handling machine recited in claim 2 further comprising means for disengaging said clamps from the product strand U-shaped portions when the stick is conveyed to said conveyor third point, said disengaging means including a switch positioned at said conveyor third point.

4. The handling machine recited in claim 1 further including means for changing the angular disposition of the initially vertically product strands, said changing means including a downwardly sloped portion of said first conveyor, said portion being defined as being between said conveyor first and second points, and a plate member having an upwardly inclined portion and a horizontal portion for engaging the downwardly depending product strand legs as the stick is conveyed along said conveyor portion, whereby the engagement of the depending legs of the product strand by said plate member as the stick travels downwardly along said conveyor sloped portion changes the angular disposition of the product strand.

5. The handling machine recited in claim 1 wherein said conveyor includes a first gear member and a second gear, the radial axis of said first gear member defining said conveyor first point and the radial axis of said second gear member defining said conveyor second point, said first and second gear members being joined by a drive belt member, a rail which extends about the periphery of said drive belt member in spaced relationship therefrom, and means attached to said drive belt for engaging the end of the stick over which the product strands are draped.

6. The handling machine recited in claim 5 wherein said drive belt member includes a first portion which slopes downwardly between said conveyor first and second points, and a second portion which extends substantially horizontally between said conveyor second and third points.

7. The handling machine recited in claim 1 further comprising means for transporting the stripped product strands to a cutting station, said transporting means including a second conveyor positioned beneath said conveyor second and third points and a table normally positioned above said second conveyor, said table being mounted for pivotal movement to below the level of said second conveyor.

8. The handling machine recited in claim 7 further comprising means for pivoting said table toward and in the same direction of travel as said second conveyor and at a speed to provide substantially the same lateral speed as said second conveyor.

9. The handling machine recited in claim 7 wherein said second conveyor is adapted for travel in a third direction corresponding to the direction of downward pivotal movement of said table.

10. An alimentary paste product handling machine for stripping long product strands from a stick over which the strands are draped, each of the strands having a U-shaped portion with depending legs, comprising a conveyor for transporting the stick over which the strands are draped in a first direction from a first point on said conveyor to a second point on said conveyor, and in a second direction from said conveyor second point to a third point on said conveyor;
    means positioned at said conveyor second point for engaging the U-shaped portions of the product strands in a jaw-like grip while said conveyor transports the stick from said conveyor second to third points;
    and means for transferring the product strands to a cutting station, said transferring means including a second conveyor positioned beneath said conveyor and a table normally positioned between said conveyors, said table being mounted for downward pivotal movement to below the level of said second conveyor.

11. An alimentary paste product handling machine for stripping long product strands from a stick over which the strands are draped, each of the strands having a U-shaped portion, comprising
    a conveyor for transporting the stick over which the product strands are draped in a first direction from a first point on said conveyor to a second point on said conveyor; and
    means located at said conveyor second point for releasably grasping the U-shaped portions of the product strands, said grasping means including a pair of opposed, movably mounted, pliant surfaces, and means for selectively moving said surfaces toward or away from each other to correspondingly grasp or release the strands at their U-shaped portions, the pliancy of said surfaces and motion of said moving means being coordinated to grasp and release the strands without damaging the strands.

12. A machine for stripping alimentary paste product strands from a drying stick, the strands each having a U-shaped portion with legs depending therefrom, comprising:
    a first conveyor for transporting the stick over which the strands are draped to a point on said first conveyor;
    a second conveyor positioned at said first conveyor point, said second conveyor including a closed track for transporting the stick in a first direction from said first conveyor point to a first point on said second conveyor, said second conveyor first point being located below the level of said first conveyor point, and for transporting the stick in a second direction away from said second conveyor first point to a second point along said second conveyor; and
    means for engaging the U-shaped portion of each product strand, said engaging means including a pair of flexible members positioned adjacent said second conveyor first point whereby the U-shaped portions of the product strands are engaged by said clamping members during the period defined by the movement of the stick between said second conveyor first and second points.

* * * * *